United States Patent [19]
Morimura

[11] Patent Number: 5,942,113
[45] Date of Patent: Aug. 24, 1999

[54] SOLID-LIQUID SEPARATING FILTER MEDIUM FOR SEWAGE, WASTE WATER, ETC

[76] Inventor: Tadaki Morimura, 5-4-25, Segawa, Minoo-shi, Oosaka, Japan

[21] Appl. No.: 08/951,042

[22] Filed: Oct. 15, 1997

[51] Int. Cl.[6] .............................. B01D 39/10; B01D 39/00
[52] U.S. Cl. ........................ 210/487; 210/483; 210/486; 210/488; 210/489; 210/490; 210/497.1; 210/499
[58] Field of Search ...................................... 210/483, 486, 210/487, 488, 489, 490, 491, 492, 497.1, 499

[56] References Cited

U.S. PATENT DOCUMENTS

| | | | |
|---|---|---|---|
| 2,028,513 | 6/1936 | Roberts . | |
| 3,620,374 | 11/1971 | Brinkema | 210/486 |
| 3,747,770 | 7/1973 | Zentis | 210/489 |
| 3,905,788 | 9/1975 | Alliger | 210/490 |
| 4,639,318 | 1/1987 | Andersson | 210/491 |
| 5,059,326 | 10/1991 | Haerle | 210/491 |
| 5,154,827 | 10/1992 | Ashelin et al. | 210/490 |
| 5,366,625 | 11/1994 | Pedersen et al. | 210/321.78 |
| 5,417,793 | 5/1995 | Bakula | 210/489 |
| 5,656,167 | 8/1997 | Martz | 210/490 |

*Primary Examiner*—David A. Reifsnyder
*Attorney, Agent, or Firm*—Armstrong, Westerman, Hattori, McLeland & Naughton

[57] ABSTRACT

A solid-liquid separating filter media (4) for sewage, waste water, etc. comprising a mono- or multi-layered filter screen (3) in which a number of filaments (1) are closely aligned in parallel and crosswise bonded to hoops (2) at predetermined points thereof to form integral blind-like structure.

17 Claims, 14 Drawing Sheets

SOLID-LIQUID SEPARATING FILTER MEDIUM FOR SEWAGE, WASTE WATER, ETC

BACKGROUND OF THE INVENTION

1. Field of the Invention

The present invention relates to a solid-liquid separating filter medium for sewage, waste water, etc. More particularly, the present invention relates to a solid-liquid separating filter medium of sufficient filtering ability for sewage, waste water, etc. which can be prepared easily and is repeatedly usable by back washing without difficulty when the filter medium is clogged due to long-term service thereof.

2. Prior Art

Floating sludge in sewage and waste water has been conventionally removed by filtration, centrifugal separation, pressurized floatation, solidification by the use of a coagulant, and the like.

In the case of filtration above all, a filtration film is generally used. It is necessary, however, to laminate a number of filtration films instead of a single use thereof so as to increase the filtration effect, while preparation of such laminated films is rather troublesome. Other filter media other than the films used for filtering sewage, waste water, etc. include various kinds of materials such as cloth, sand, ceramics, porous medium and the like. These media tend to cause clogging during long-term service, which are hardly reused by back washing.

SUMMARY OF THE INVENTION

An object of the present invention is to provide a solid-liquid separating filter medium for sewage, waste water, etc. comprising a filter screen in which a number of filaments are closely aligned in parallel in the same direction and crosswise bonded to hoops at predetermined points thereof to form integral blind-like structure.

Another object of the present invention is to provide a solid-liquid separating filter medium for sewage, waste water, etc. comprising an inner cage formed by bonding a plurality of lateral frame crosspieces arranged at certain spaces and vertical supports arranged at plural points on the circumference of the lateral frame crosspieces to cross at right angles on a surface thereof at intersecting points of the lateral frame crosspieces and the vertical supports and an outer wall formed by winding up a filament closely in the circumferential direction but at a certain space on an outer surface of the cage.

DETAILED DESCRIPTION AND PREFERRED EMBODIMENTS OF THE INVENTION

A ribbon may be used to form a filter medium instead of a hoop. The ribbon may be made of plastics, metal, etc. and is not restricted to a specific material.

A laminate of plural filter screens is effectively used for solid-liquid separation and may be applied in a plane form or a cylindrical form.

When the filter screens are laminated flatwise, parallel filaments of each screen may be aligned each other to the same or the different direction.

Thickness of each parallel filament of the filter screen may be increased or reduced in order from one side to the other. A unit of filaments of the same thickness may also be aligned in parallel to yield certain width thereof, followed by arranging such a unit of filaments in series while increasing or reducing their thickness in order as a unit.

Further, the filter screen may be rolled up to form a whirled cylindrical solid-liquid separating filter medium.

On the other hand, circular, oval or square frame crosspieces provides a hollow solid-liquid separating filter medium of the present invention in a cylinder, elliptic cylinder or square pole shape, respectively. A plurality of cylindrical solid-liquid separating filter media having different diameters may be arranged concentrically at certain spaces each other to form cylindrical multi-layer structure, while a series of similarly shaped filter media may be arranged in parallel.

A material used for forming the filter screen or the hollow filter medium includes plastics, metal fiber, carbon fiber, ceramics, glass fiber and the like, if such a material has desirable resistance.

Thickness or a cross-sectional shape of filaments to be aligned in parallel as the filter screen or the hollow filter medium is not especially restricted, while such thickness or a cross-sectional shape is not necessarily the same when a plurality of the filter screens or the hollow filter media is multi-layered or arranged in parallel. These filaments may be crisped.

Preferably, filaments of about 0.03 mm to 0.5 mm in diameter are used, although a more thick or thinner diameter can be applied.

However, excessively thinner filaments tend to reduce strength of the filter screen and would exhibit an insufficient filtering function. On the other hand, excessively thick filaments also provide a filtering function enough to be required. The filaments may be rough or smooth on the surface.

A method for bonding filaments of the filter screen and the lateral crosspieces is not especially restricted.

As is described above, it is quite easy to reuse the solid-liquid separating filter medium for sewage, waste water, etc. of the present invention by back-flowing the filtered liquid so that sludge floated therein can be removed, which prevents clogging of the filter medium without difficulty. Accordingly, there are provided more stable filtering properties and lower frequency in exchanging of the filter medium, i.e., easier maintenance thereof compared with conventional one, thereby increasing a filtering efficiency.

A proper combination of a shape, a material and thickness of the filaments, as well as numbers and directions of lamination of the filter screens can conveniently provide filtering properties depending on a kind of sewage or waste water to be filtered and a filtering degree to be attained.

A filter medium of multi-layered structure may be easily prepared by simply rolling up a blind-like filter screen to form a whirled cylinder.

As the filtering filaments are regularly aligned in parallel at certain spaces, the filter medium can be easily reused by back-flowing the filtered liquid to remove sludge when clogging is occurred.

A filter screen prepared by arranging units of filaments having different thickness is rolled up to form a whirled cylindrical filter medium, i.e., multi-layered structure in which thickness of the layer changes in the inner or outer direction on the cross-sectional surface of a circumferential wall portion thereof. This is one of the most appropriate structure as a filter medium.

A filter medium of an inner cage type is easily prepared by a simple process in which a filament is wound up on the outer circumferential portion of the cage to form a hollow body. It is convenient that void spaces on the circumferential wall can be easily controlled by changing number of turns of the filament. It is also convenient to repair a partial breakage of the filter medium without difficulty by rewinding up the filament. Because of a constant direction of winding and void spaces, the filter medium is reusable by back-washing the filtered liquid to remove sludge, thereby keeping the filtering properties in a preferred condition.

Referring now to the drawings, the present invention will be further described in the following.

Figure 1:
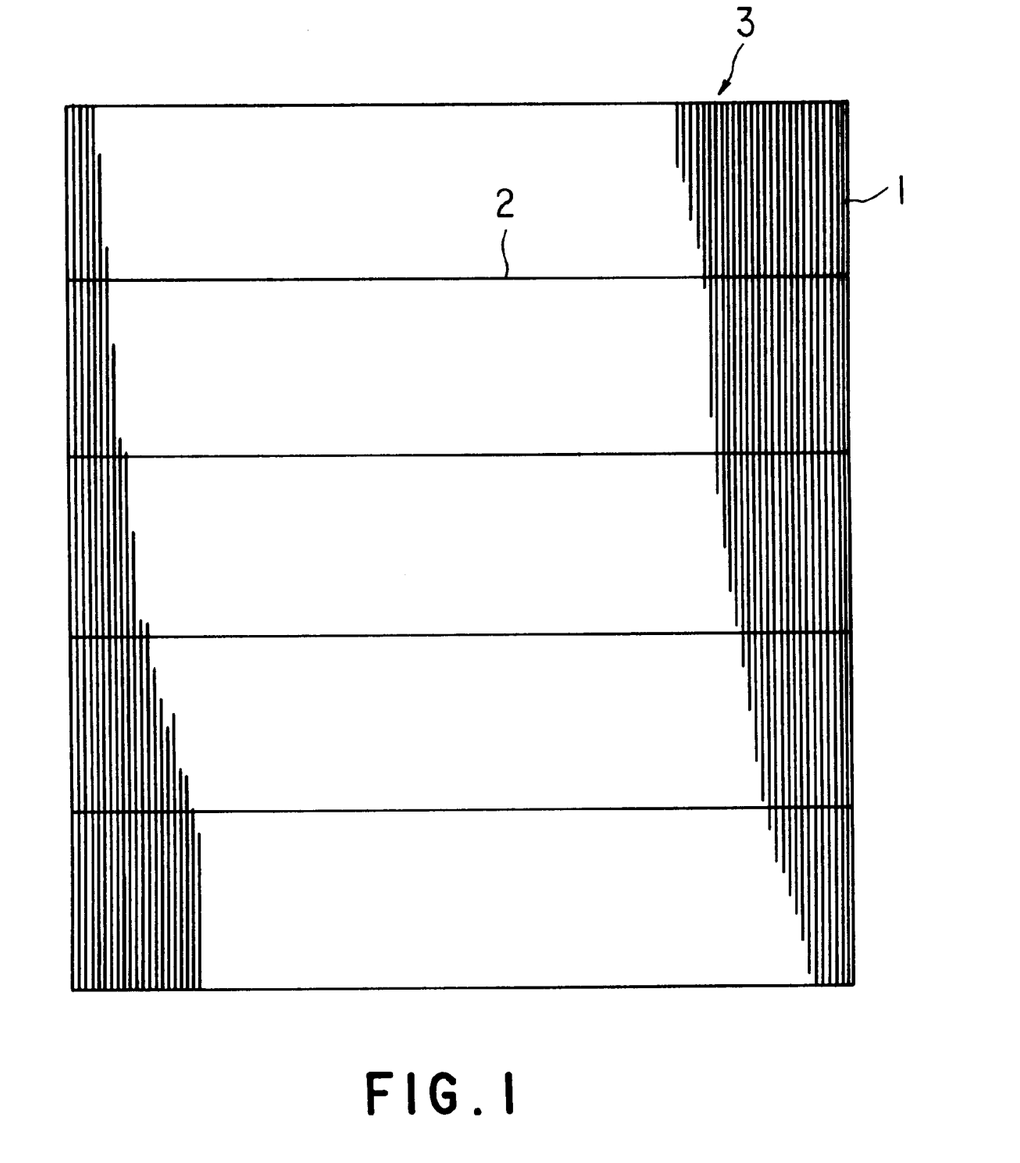
FIG. 1 is a view of filter screen constructing a filter medium of the present invention.

FIG. 1 is a view of a filter screen 3 constructing a filter medium of the present invention. The filter screen 3 is prepared by bonding a number of propylene filaments 1 which are closely aligned in parallel in the vertical direction to thermoplastic lateral frame crosspieces 2 which are arranged in the lateral direction at plural points in the vertical direction of the filaments 1 and integrally bonding the lateral frame crosspieces 2 to the filaments 1 to form blind-like structure as a whole. Width of the filter screen is about 1 m, a space between the lateral frame crosspieces is about 20 cm and thickness of the filaments 1 and the crosspieces 2 is about 0.2 mm in diameter. Lateral and vertical dimensions of the filter screen may be variable depending on size of a filter system. The space between the lateral frame crosspieces 2 may be decided to stably sustain a shape of the filter screen and preferably, in the range of about 3 cm to 30 cm in general.

Figure 2:
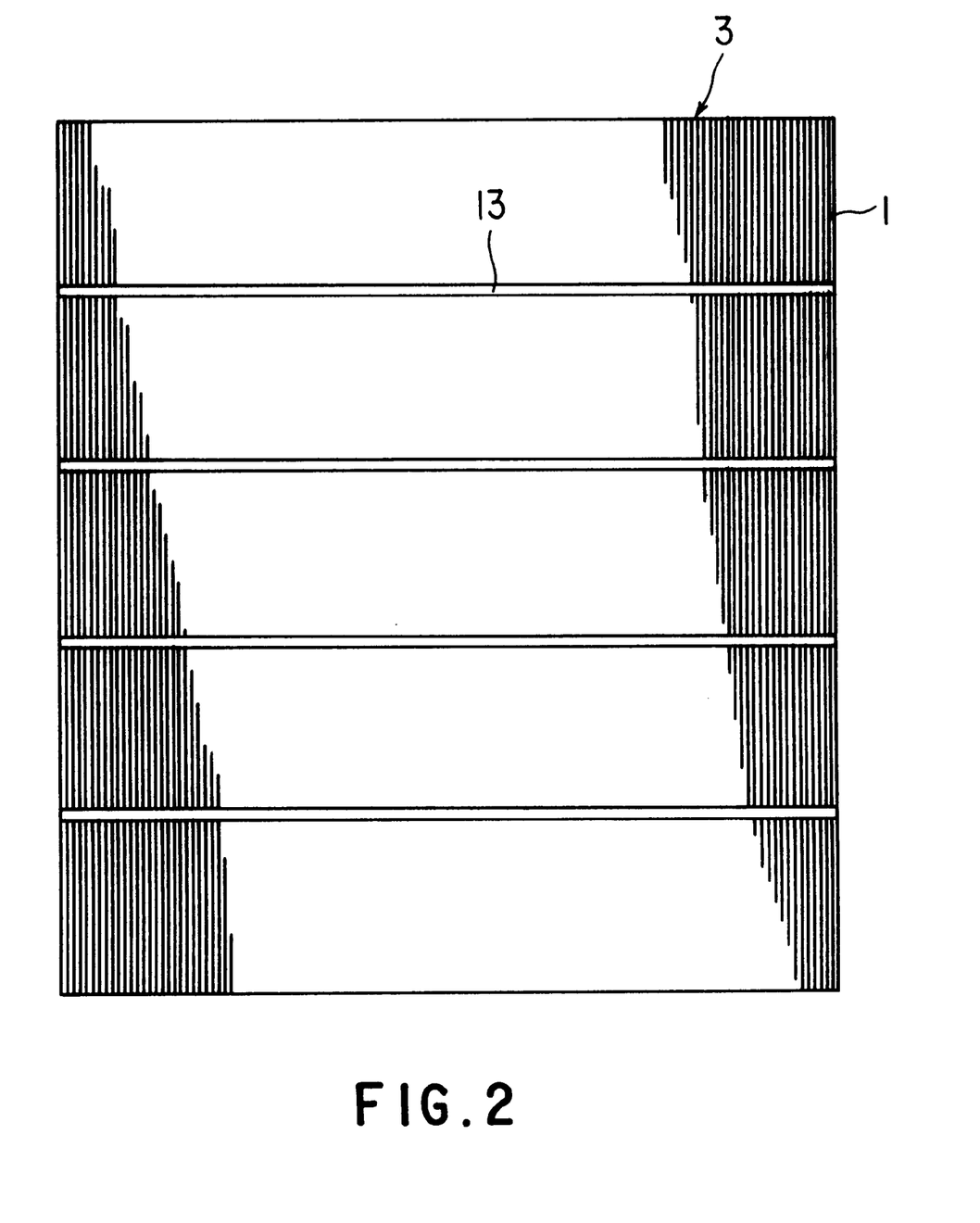
FIG. 2 is a view of an embodiment of a filter screen different from one shown in FIG. 1.

As shown in FIG. 2, plastic ribbons 13 may be used instead of the lateral frame crosspieces 2. When such ribbons are used, the filter screen becomes more flexible, which is convenient to form a cylindrical type.

Figure 3:
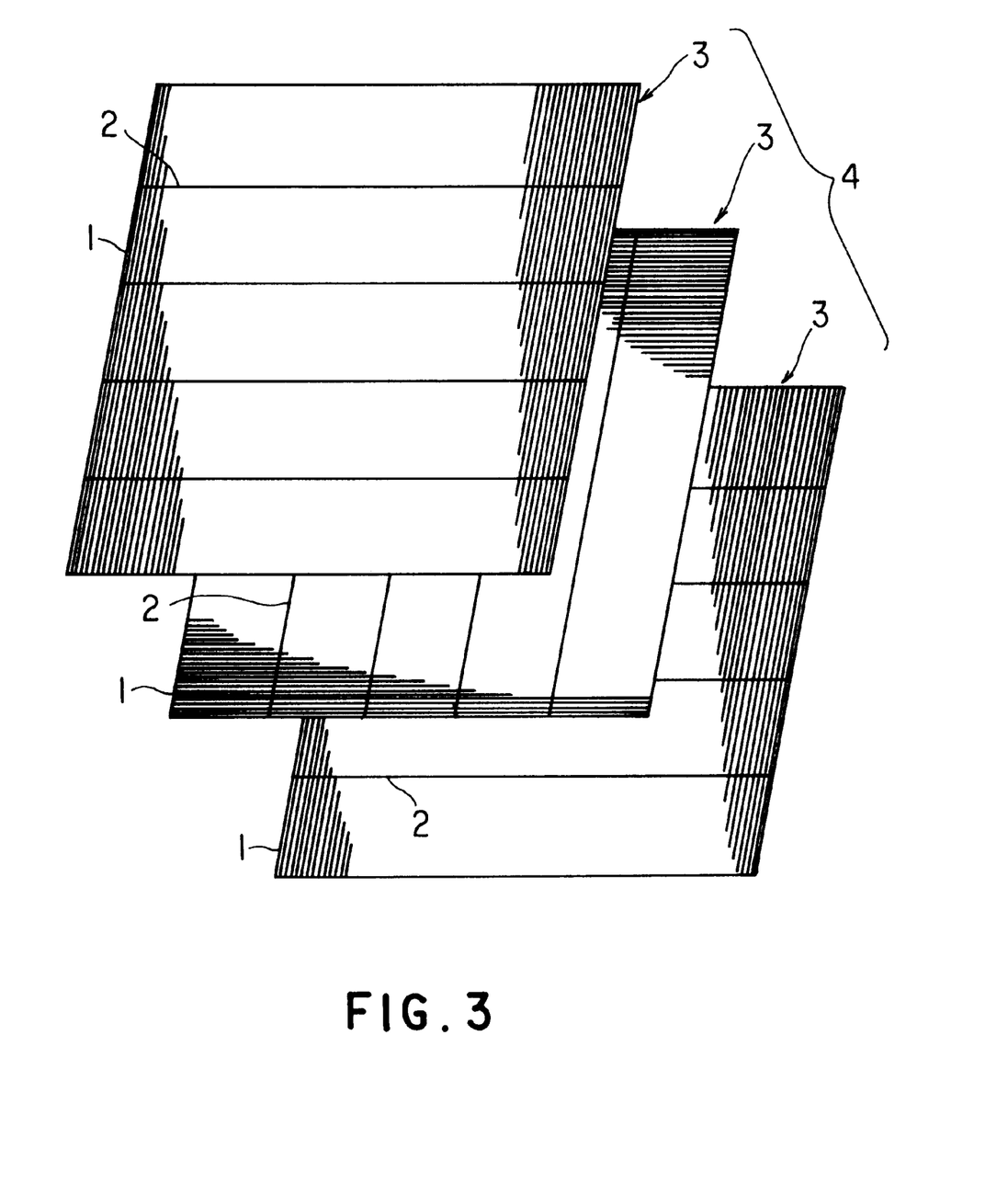
FIG. 3 is an illustration of a filter medium of the present invention.
Figure 4:
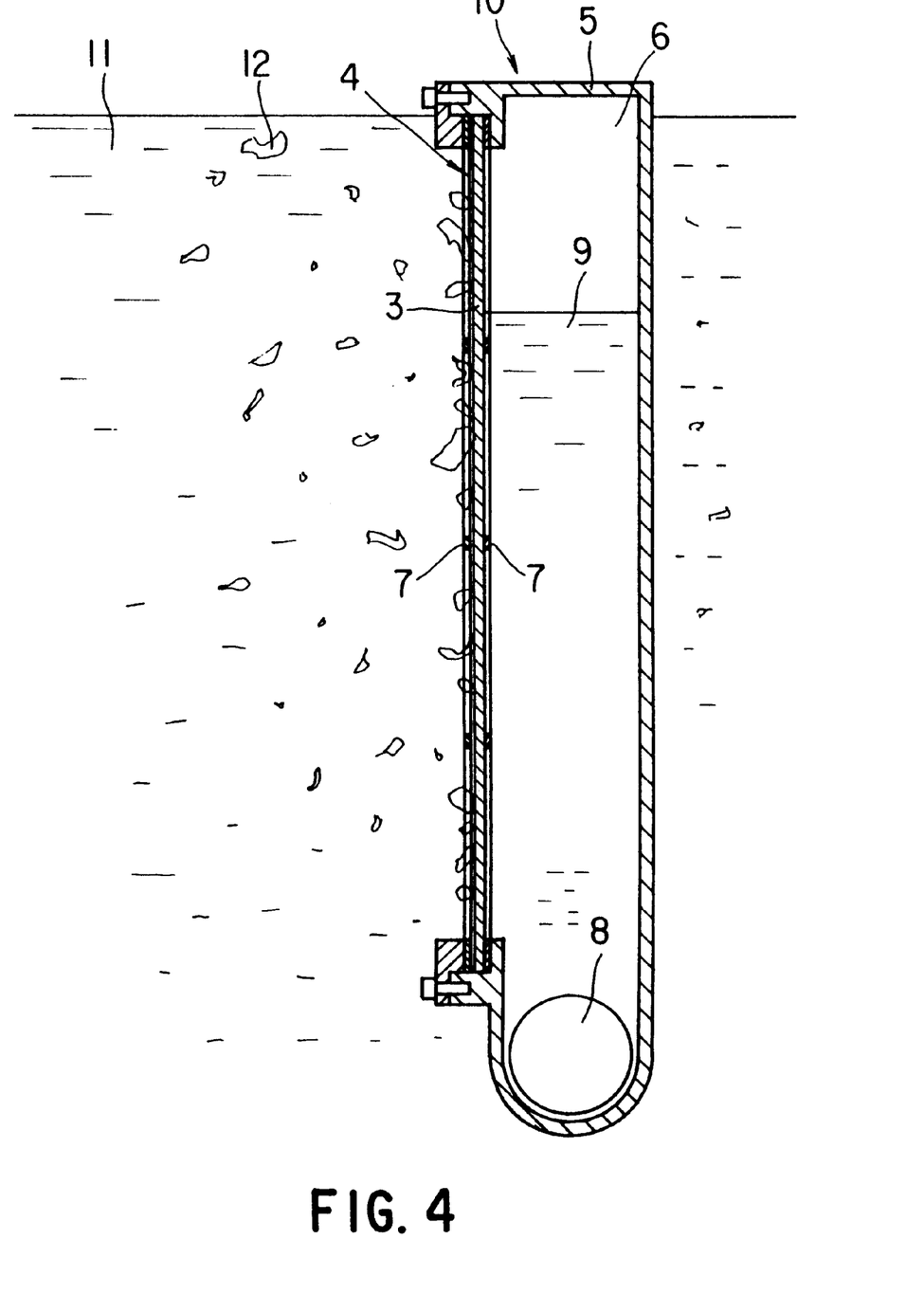
FIG. 4 shows an application of a filter medium shown in FIG. 3.

The filter medium of the present invention is prepared by laminating a plurality of these filter screens 3. FIG. 4 is an illustration of a filter medium 4 prepared by laminating three filter screens 3 flatwise so that the filaments 1 meet at right angles between each of the filter screens 3.

The filter medium 4 shown in FIG. 3 is used, for example, in a manner as shown in FIG. 4. The filter medium 4 is fitted on a body 5 of a filter system 10 to be used in a sewage purifier, etc. The body 5 is provided with a permeating space 6 for the filtered liquid, while the filter medium 4 is fixed on an opening of the body 5 by means of a support 7. A pipe 8 communicating to the permeating space 6 is connected to the body 5.

Referring to FIG. 4, a filtering process using the filter medium of the present invention will be described in the following.

Untreated liquid 11 of sewage or waste water is filtered while passing through the filter medium 4 and introduced to the permeating space 6 of the body 5. Sludge 12 floating in the untreated liquid 11 of sewage or waste water is separated by means of the filter medium 4. After a long-term filtration, sludge 12 is accumulated on the surface of the filter medium 4 to cause clogging. Once such clogging is occurred, then an amount of the filtered liquid 9 flowed into the permeating space 6 is decreased. As the filtered liquid 9 in the permeating space 6 is quantitatively drained through the pipe 8, a water level of the filtered liquid 9 is lowered when the flowed amount of the filtered liquid is decreased. When the water level of the filtered liquid 9 is decreased to a predetermined level, a sensor (not shown) detects such a decrease in the water level, thereby causing a valve (not shown) mounted on the pipe 8 to flow back the filtered liquid 9 through the filter medium 4. The sludge 12 accumulated on the surface of the filter medium 4 are thus removed to dissolve clogging.

Figure 5:
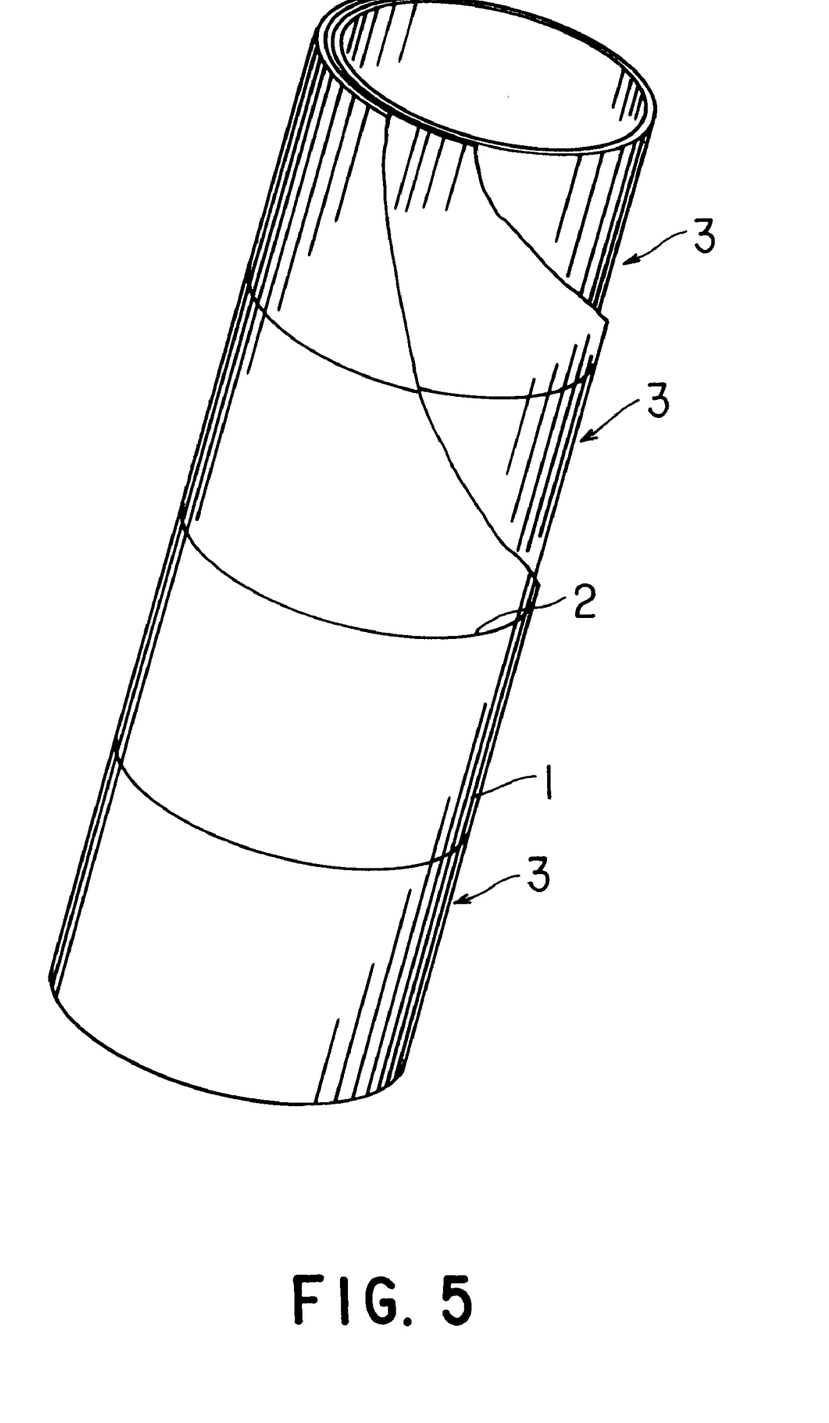
FIG. 5 is a view of another type of filter medium different from one shown in FIG. 3.

FIG. 5 shows a filter medium prepared by laminating three filter screens 3 to form a cylinder. These three filter screens 3 are laminated to each other closely without leaving a space.

Figure 6:
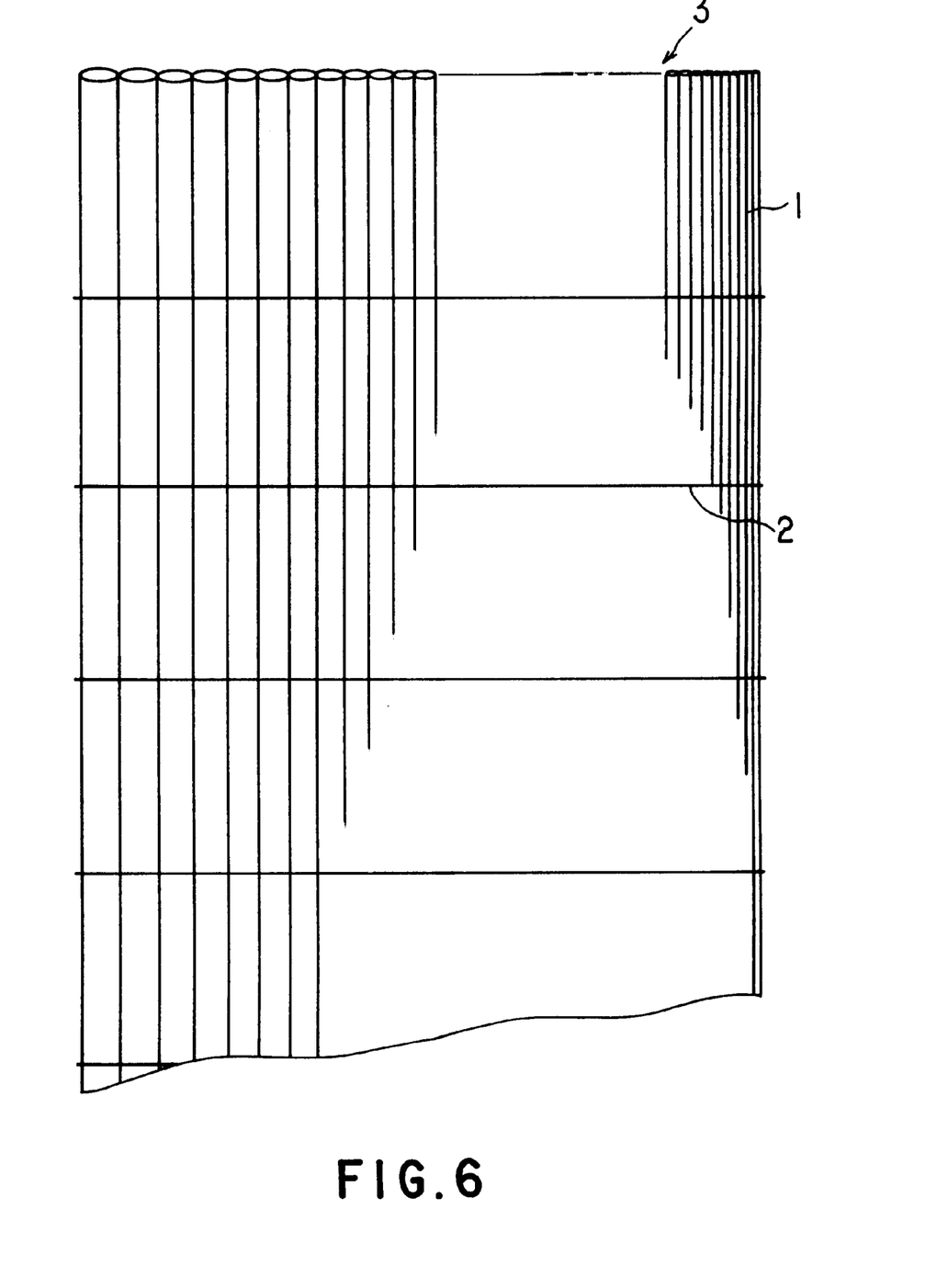
FIG. 6 is a view of another filter screen different from one shown in FIG. 1.

FIG. 6 shows filter screen structure different from the filter screen shown in FIG. 1. The filter screen 3 in this embodiment is provided with filaments 1 in parallel which thickness is increased in order from left to right hands of the figure. The thinnest filament is about 0.01 mm in diameter, while the most thick filament is about 0.5 mm in diameter.

Figure 7:
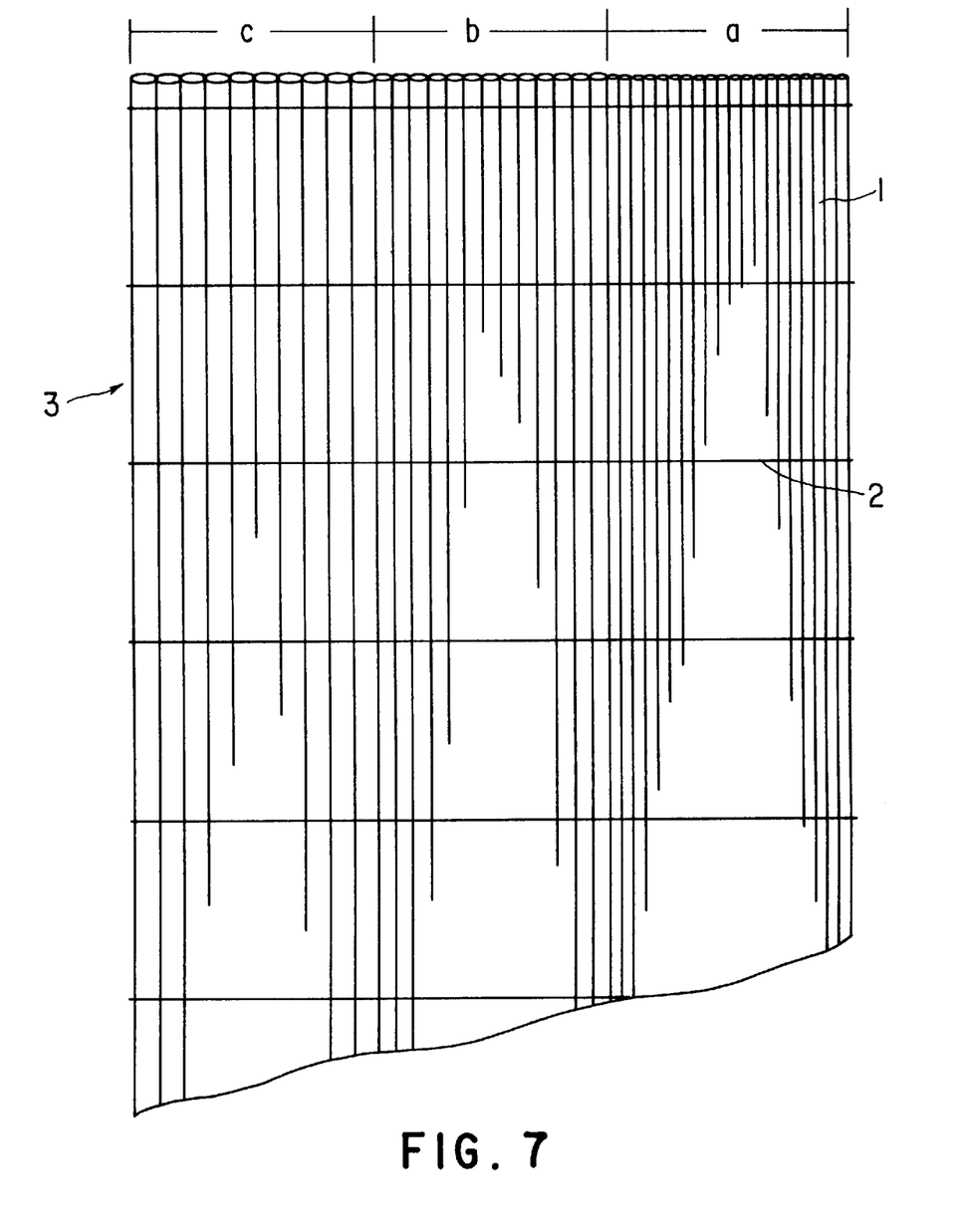
FIG. 7 is a view of still another filter screen.

FIG. 7 shows another filter screen of the present invention. The filter screen 3 of this embodiment comprises three units a, b and c of filaments 1 in which thickness thereof is the same each other within a unit and increases in order of the units a, b and c.

Thickness of filaments 1 of the units a, b and c is about 0.05 mm, 0.25 mm and 0.5 mm in diameter, respectively.

Figure 8:
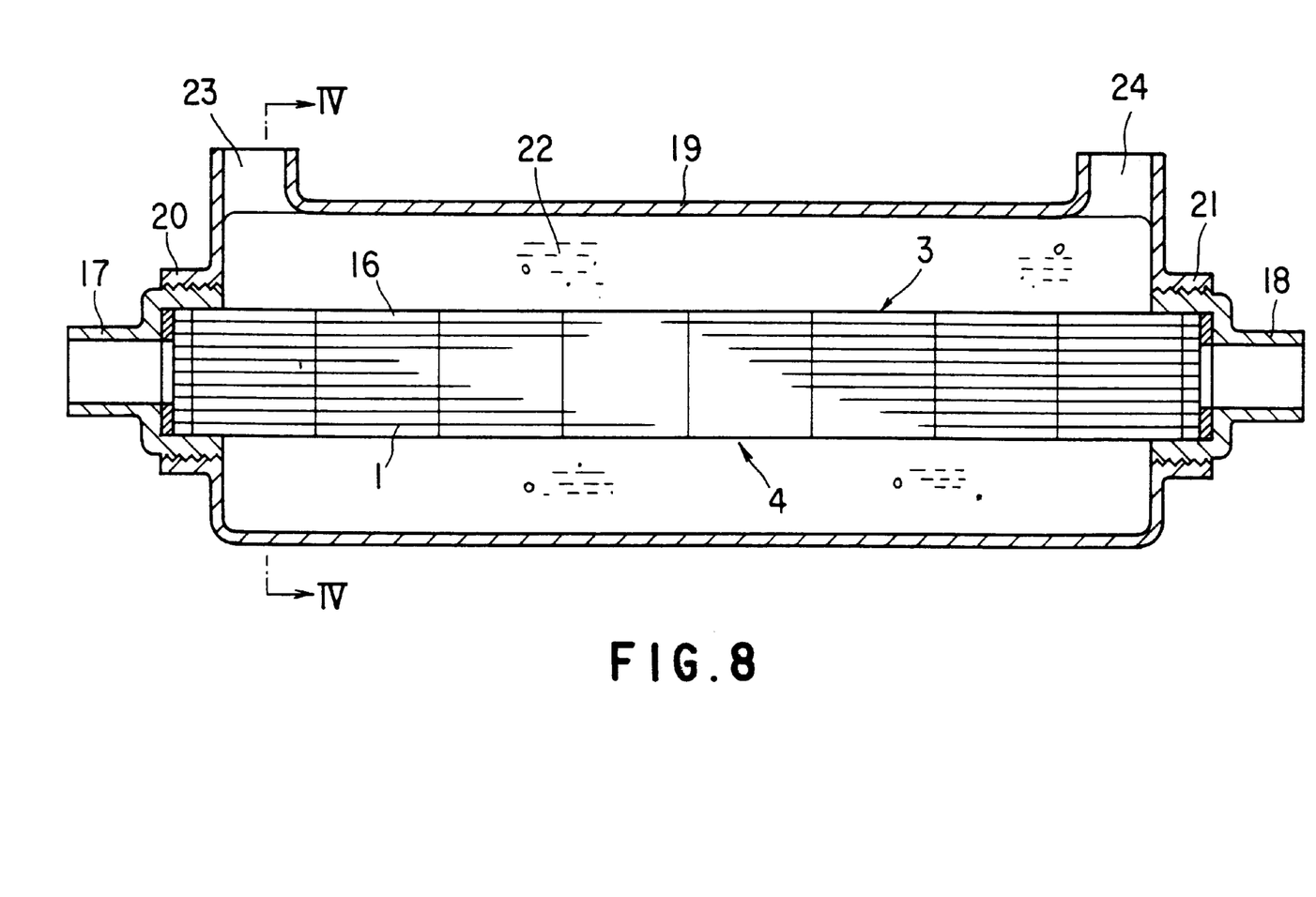
FIG. 8 is a cross sectional view of a filter system using a filter medium.
Figure 9:
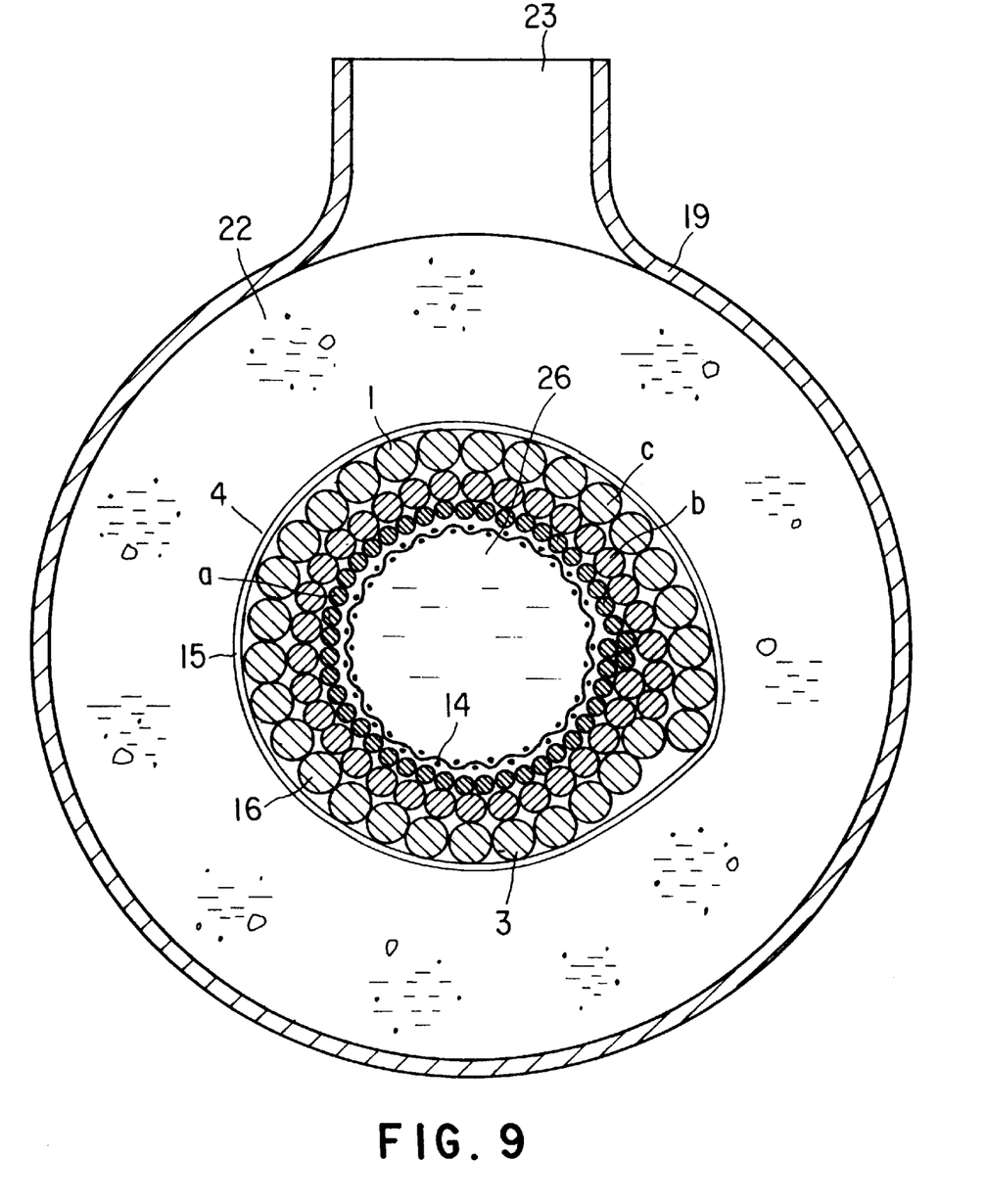
FIG. 9 is a section on line IX—IX in FIG. 8.

An embodiment applied this filter screen is shown in FIGS. 8 and 9. FIG. 8 is a central cross sectional view of a filtering system provided with a filter medium as a whole, while FIG. 9 is a section on line IX—IX in FIG. 8. In the filtering system, the filter screen 3 is rolled up a few times around a cylindrical wire net core 14 to form a cylinder, which is then fastened by means of a fixing ring 15 to form a cartridge type cylindrical filter medium 4. That is, the cylindrical filter medium 4 is provided with a circumferential wall portion 16 comprising multi-layered structure of the filter screen 3. In the cylindrical filter medium 4, the filter screen 3 is rolled up so that the more thick filaments are arranged outside and the thinner ones inside. The core 14 may be of any cylindrical structure made of, for example, a plastic net other than the wire net.

The cylindrical filter medium 4 is detachably fitted with both ends thereof inside of a casing 19 by means of fitting adapters 17 and 18. More precisely, the fitting adaptors 17 and 18 are screwed to openings 20 and 21 formed on side walls of both sides of the casing 19. The casing 19 is provided with inlets 23 and 24 for untreated liquid 22 of sewage or waste water. The untreated liquid 22 supplied to the case 19 is passed through the a circumferential wall portion 16 of the cylindrical filter medium 4 into inside thereof. The untreated liquid 22 is filtered when it passes through the circumferential wall portion 16 and the thus filtered liquid 25 flows the inside portion 26 of the cylindrical filter medium 4 and drains out of one or both ends of the casing 19.

According to this embodiment, the cylindrical filter medium is prepared by rolling up the filter screen 3 so that the unit c of the thick filaments is arranged outside and the unit a of the thinnest filaments inside, however, it is possible to arrange the thick filaments inside and the thinnest outside. In the latter case, the untreated liquid 22 is allowed to inversely flow from inside to outside of the cylindrical filter medium 4.

Figure 10:
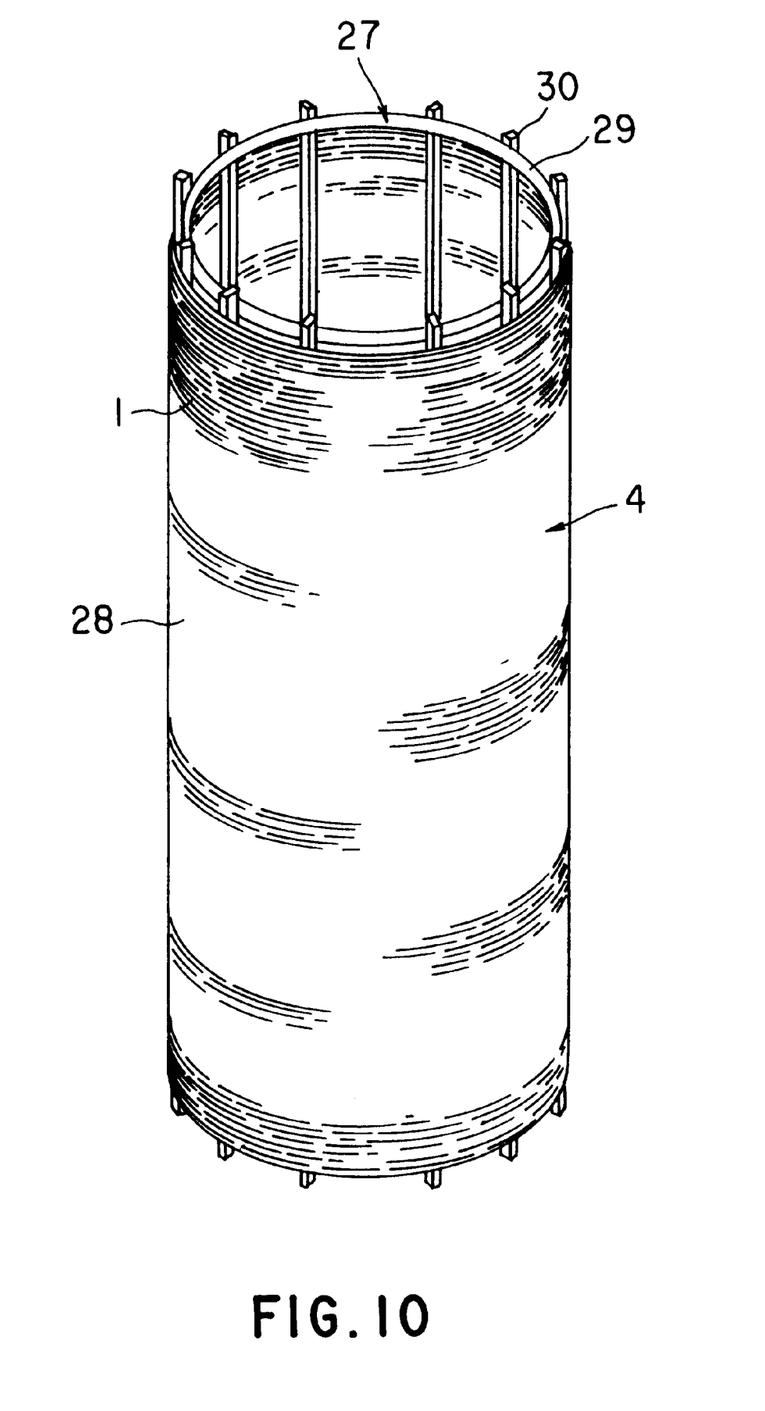
FIG. 10 is a view of another embodiment of a filter medium.
Figure 11:
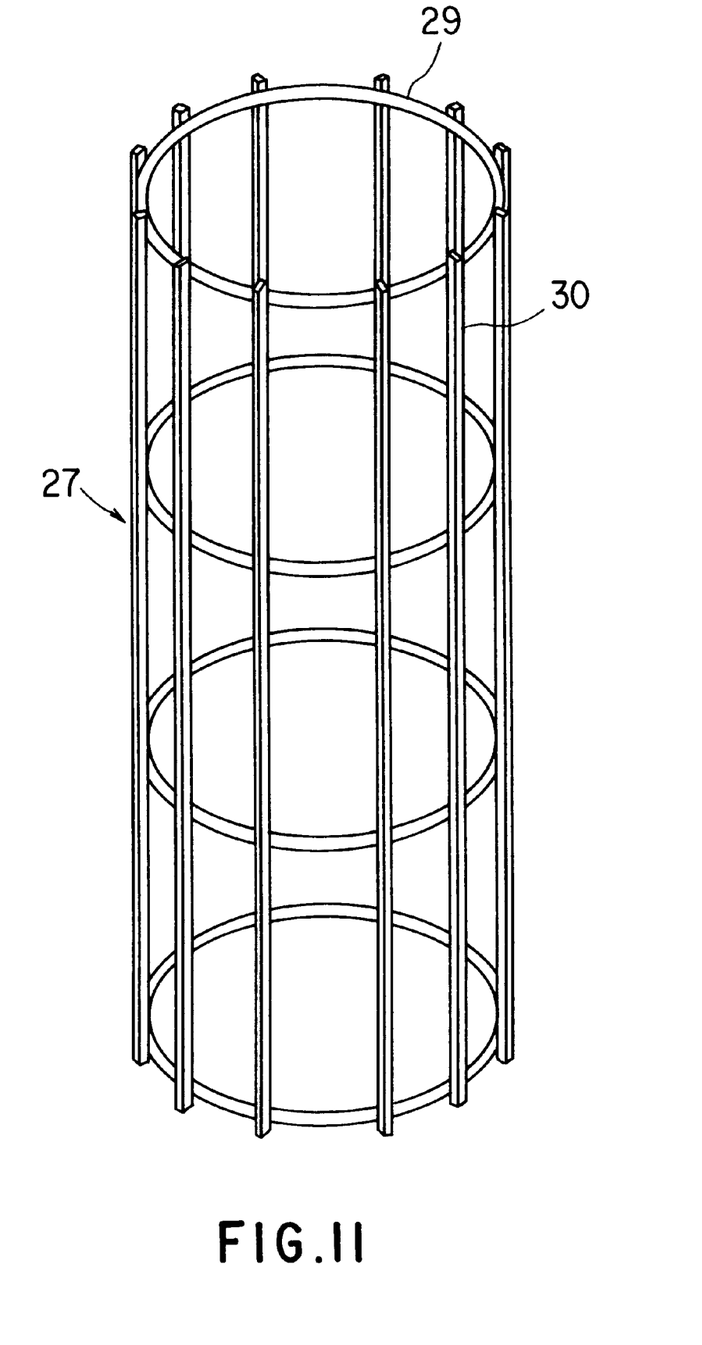
FIG. 11 is an illustration of an inner cage for a filter medium.

FIG. 10 shows a filter medium 4 of another embodiment and FIG. 11 shows an inner cage 27 is used for forming the filter medium 4 shown in FIG. 10. The inner cage 27 consists of lateral frame crosspieces 29 and vertical supports 30. More precisely, a plurality of lateral frame crosspieces 29 are arranged at certain spaces, while the vertical supports 29 are arranged at plural points in the circumferential direction of the lateral frame crosspieces 29 to cross at right angles on a surface thereof, intersecting portions of the lateral frame crosspieces 29 and the vertical supports 30 being integrally bonded. Although both of the lateral frame crosspieces 29 and the vertical supports 30 are made of plastics in this embodiment, they may be made of metal if such a metal has rigidity to certain extent and required resistance.

The hollow filter medium 4 shown in FIG. 10 is prepared by winding a polypropylene filament 1 of 0.1 mm in diameter on the outer circumferential portion of the inner cage 27 in the circumferential direction at slight spaces between neighboring filaments to form a circumferential wall 28 appropriately provided with voids thereof.

Figure 12:
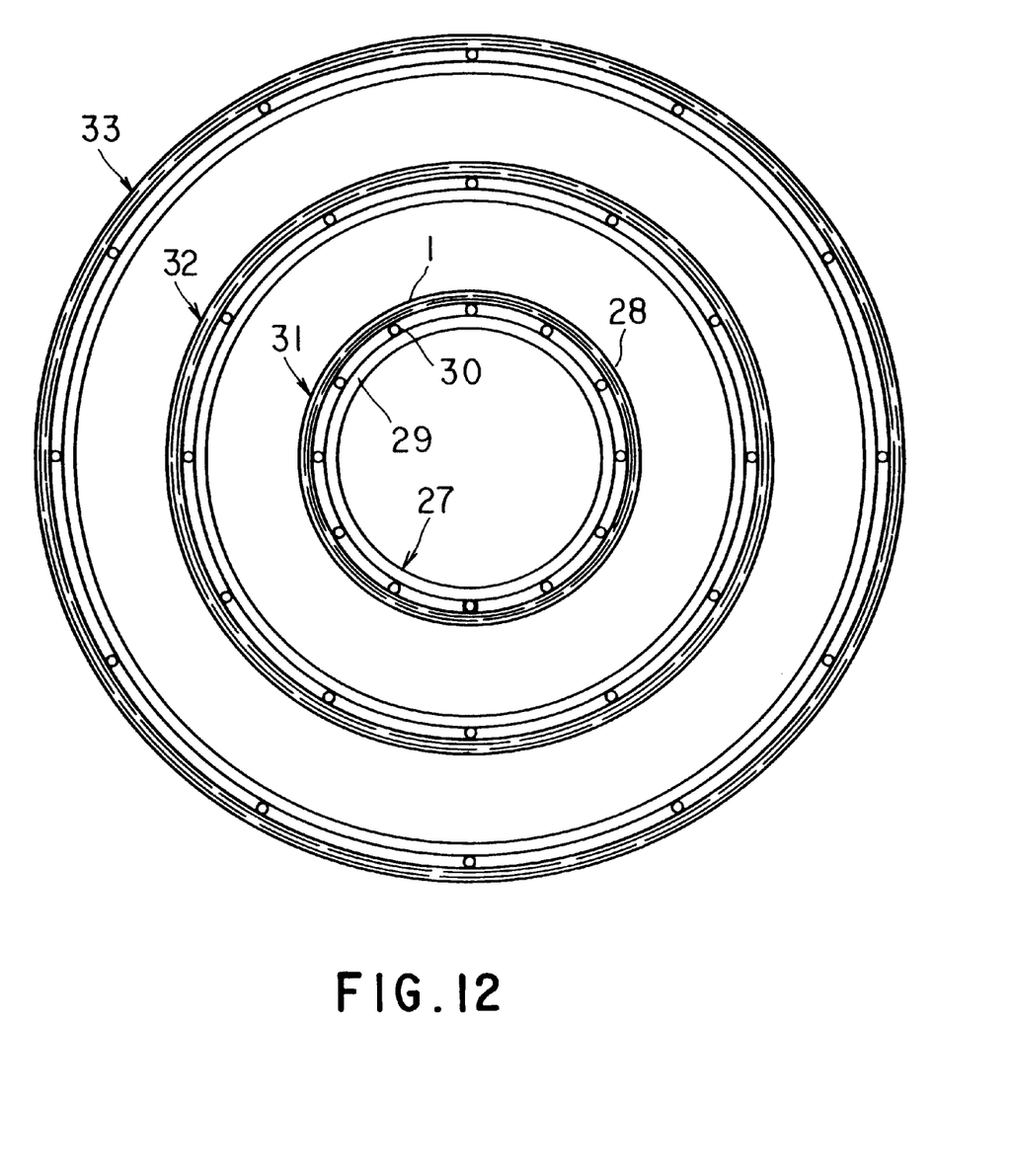
FIG. 12 is a transverse sectional view of a filter medium of multi-layer structure.
Figure 13:
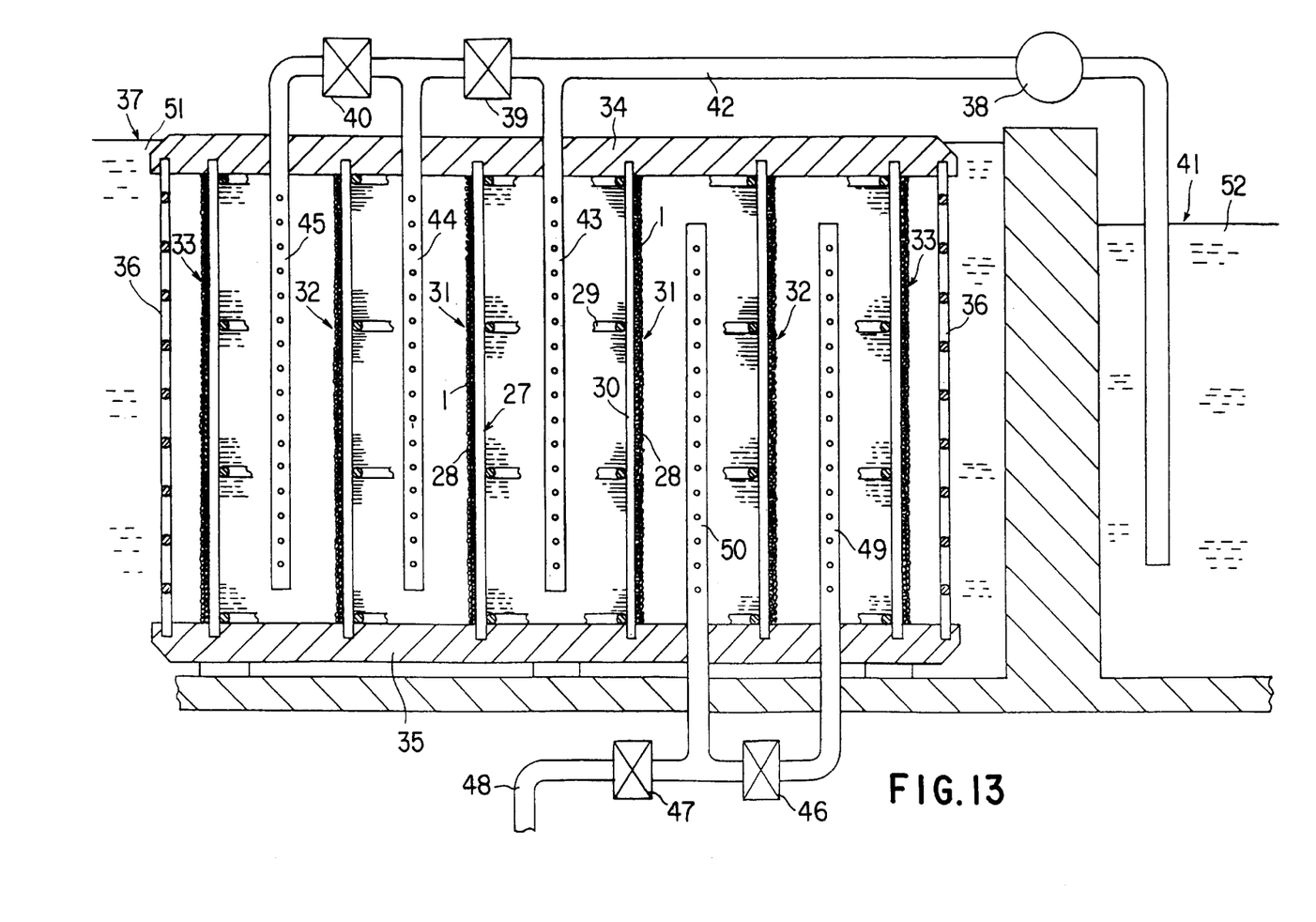
FIG. 13 is a partly sectional schematic illustration of a filter system practically used filter media shown in FIG. 12.

FIG. 12 is a transverse sectional view of three hollow filter media 31, 32 and 33 having different diameters which are arranged each other trimly and concentrically at certain spaces. FIG. 13 is a partially sectional illustration of a filtering system in which the filter media shown in FIG. 12 are practically applied.

A material and thickness of filaments used in these three hollow filter media 31, 32 and 33 may either be same or different. Further, when the filaments have the same diameter, number of turns thereof may be different.

In this filtering system, the trimly arranged hollow filter media 31, 32 and 33 are installed inside of a sewage tank 37 in such situation where the upper and bottom openings thereof are capped by means of an upper lid 34 and a bottom lid 35, while a net-like protective cover 36 is fitted around the filter medium 33. A suction pipe 42, which one end is put in a treated water tank 41, is provided with a pump 42 and valves 39 and 40 and connected with three branch pipes 43, 44 and 45 which penetrate the upper lid 34 and are put inside of the innermost hollow filter media 31, between the innermost and the intermediate hollow filter media 31 and 32 and between the intermediate and the outermost hollow filter media 32 and 33, respectively. On the other hand, a drain pipe 48 is provided with valves 46 and 47 and connected with two branch pipes which penetrate the bottom lid 35 and put between the innermost and the intermediate hollow filter media 31 and 32 and between the intermediate and the outermost hollow filter media 32 and 33, respectively.

Filtering process in this filtering system is as in the following. Untreated sewage liquid 51 in the sewage tank 37 is passed through the outermost, the intermediate and then the innermost hollow filter media 33, 32 and 31 one after the other to subject filtration in three stages, respectively, and pumped up by means of the suction pump 42 to the treated water tank 41. The liquid filtered only through the outermost and the intermediate hollow filter medium 33 and 32 can be obtained when the valve 39 is opened, while the liquid treated only through the outermost hollow filter medium 33 is obtainable, and accordingly, these valves 39 and 40 are switched depending on the purpose.

When these hollow filter media 31, 32 and 33 are clogged, the filtered liquid 52 in the treated water tank 41 is pumped up by reversing the pump 38 of the suction pipe 42 to cause back-flow in the suction pipe 42. The filtered liquid 52 is then erupted out of the branch pipes 43, 44 and 45, thereby the hollow filter media 31, 32 and 33 being washed from inside thereof to easily dissolve a problem of clogging. The thus back-flowed liquid can be removed by means of the drain pipe 48. The back-flow can be conducted timely by automatic control. As has been described above, clogging can be dissolved without difficulty.

Figure 14:
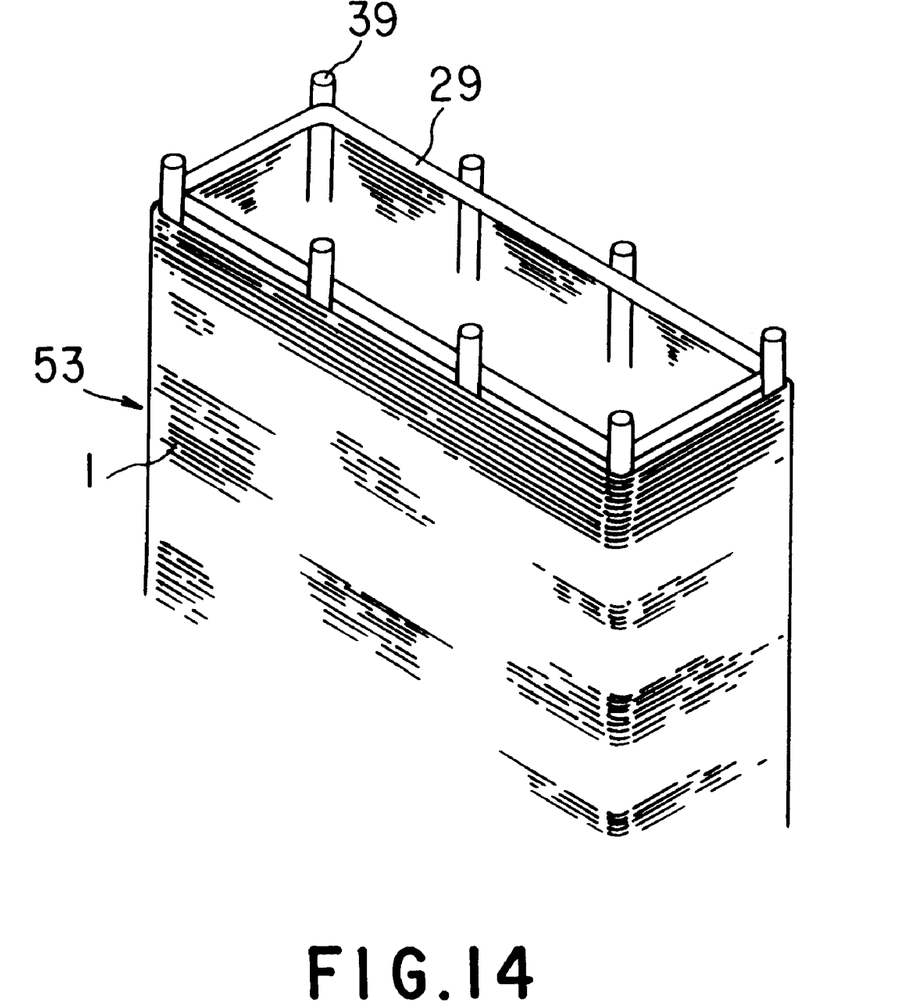
FIG. 14 is a view of yet another embodiment of a filter medium.

FIG. 14 shows a hollow filter medium 53 of yet another embodiment of the present invention. According to this embodiment, the lateral frame crosspieces are rectangle which forms a filter medium in a square prism shape. Basic structure is the same as the above mentioned cylindrical one.

A plurality of the hollow filter media 53 of this embodiment can be arranged in parallel to use for sewage or waste water filtration, similarly as in the case of cylindrical hollow filter media.

What is claimed is:

1. A solid-liquid separating filter medium for sewage, waste water, etc. comprising a filter screen in which a number of filaments are closely aligned in parallel in the same direction and crosswise bonded to cross-members at predetermined points thereof to form integral blind-like structure, the filaments having a maximum diameter of 0.5 mm and the cross-members being spaced from adjacent cross-members by at least 3 cm.

2. A solid-liquid separating filter medium claimed in claim 1, wherein ribbons are used as cross-members.

3. A solid-liquid separating filter medium claimed in claim 1, wherein a plurality of said filter screens are laminated.

4. A solid-liquid separating filter medium claimed in claim 3 wherein the filter screens are laminated flatwise.

5. A solid-liquid separating filter medium claimed in claim 4 wherein the filter screens are laminated so that filaments are directed in the same direction.

6. A solid-liquid separating filter medium claimed in claim 4 wherein the filter screens are laminated so that filaments are directed in the different direction.

7. A solid-liquid separating filter medium claimed in claim 3 wherein the filter screens are laminated cylindrically.

8. A solid-liquid separating filter medium claimed in claim 1 wherein the filter screen is formed by aligning the filaments in parallel of different thickness in a gradually thickened or thinned order.

9. A solid-liquid separating filter medium claimed in claim 1 wherein the filter screen is formed by aligning the filaments of the same thickness to result in a unit thereof in certain width and arranging plural units thereof in a gradually thickened or thinned order.

10. A solid-liquid separating filter medium claimed in claim 8 wherein the filter screen is rolled up to form a whirled cylinder shape.

11. A solid-liquid separating filter medium claimed in claim 9 wherein the filter screen is rolled up to form a whirled cylinder shape.

12. A solid-liquid separating filter medium claimed in claim 1, wherein cross-pieces are used as cross-members.

13. A solid-liquid separating filter medium for sewage, waste water, etc. comprising an inner cage formed by bonding a plurality of lateral frame crosspieces arranged at certain spaces and vertical supports arranged at plural points on the circumference of the lateral frame crosspieces to cross at right angles on a surface thereof at intersecting points of the lateral frame crosspieces and the vertical supports, and an outer wall on an outer surface of the cage, the outer wall formed by a single filament wound closely upon itself in the circumferential direction, but at a certain spacing, on the outer surface of the cage.

14. A solid-liquid separating filter medium claimed in claim 13 wherein the lateral frame crosspieces are circular.

15. A solid-liquid separating filter medium claimed in claim 13 wherein the lateral frame crosspieces are square.

16. A solid-liquid separating filter medium claimed in claim 13 wherein the lateral frame crosspieces are oval.

17. A solid-liquid separating filter medium for sewage, waste water, etc. claimed in claim 14 wherein a plurality of the filter media of different thickness are concentrically arranged.

* * * * *